US008682382B2

(12) United States Patent
Onishi

(10) Patent No.: US 8,682,382 B2
(45) Date of Patent: Mar. 25, 2014

(54) PORTABLE TERMINAL AND ITS COMMUNICATION METHOD, AND WIRELESS NETWORK SYSTEM

(75) Inventor: Kazuo Onishi, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 462 days.

(21) Appl. No.: 12/593,905

(22) PCT Filed: Mar. 31, 2008

(86) PCT No.: PCT/JP2008/056352
§ 371 (c)(1),
(2), (4) Date: Nov. 11, 2009

(87) PCT Pub. No.: WO2008/120781
PCT Pub. Date: Oct. 9, 2008

(65) Prior Publication Data
US 2010/0136975 A1 Jun. 3, 2010

(30) Foreign Application Priority Data
Mar. 29, 2007 (JP) .................................. 2007-089766

(51) Int. Cl.
*H04M 1/00* (2006.01)
*H04W 36/00* (2009.01)
*H04B 1/40* (2006.01)
*H04W 4/00* (2009.01)

(52) U.S. Cl.
USPC .......... 455/550.1; 455/436; 455/420; 455/76; 370/331

(58) Field of Classification Search
None
See application file for complete search history.

(56) References Cited

U.S. PATENT DOCUMENTS

| 7,937,083 B2* | 5/2011 | Oommen ................... 455/432.3 |
| 2002/0197992 A1* | 12/2002 | Nizri et al. ................... 455/435 |
| 2004/0127208 A1* | 7/2004 | Nair et al. ................... 455/420 |
| 2004/0176024 A1* | 9/2004 | Hsu et al. ................... 455/3.04 |
| 2004/0192221 A1* | 9/2004 | Matsunaga ................... 455/76 |
| 2006/0120329 A1* | 6/2006 | Kim et al. ................... 370/331 |
| 2007/0041344 A1* | 2/2007 | Yaqub et al. ................ 370/331 |

FOREIGN PATENT DOCUMENTS

| JP | H10-257549 | 9/1998 |
| JP | 2004-304399 | 10/2004 |
| JP | 2005-51568 | 2/2005 |
| JP | 2005-269019 | 9/2005 |

OTHER PUBLICATIONS

Policy-Enabled Handoffs Across Heterogeneous Networks, "Wang, Helen"; Katz and Giese, published at WMCSA '99, New Orleans, LA.*
International Search Report for PCT/JP2008/056352, mailed May 27, 2008, 1 page.

* cited by examiner

*Primary Examiner* — Jinsong Hu
*Assistant Examiner* — William Nealon
(74) *Attorney, Agent, or Firm* — Duane Morris LLP

(57) ABSTRACT

A portable terminal capable of reliably carrying out reselection even though power consumption is reduced and thereby increasing the chance to wait for connection to the upper-layer communication system so as to realize a long-time communication system so as to realize a long-time standby and to enable an increase of the traffic efficiency. A portable terminal communication method and a wireless network system are also disclosed. The portable terminal (10) has control section (8) which acquires neighboring base station information from the base station with which the terminal (10) is communicating through a communication section (1), monitors the signal intensity in the communication system which the terminal (10) is using, carries out hand-off from the communication system being used to another communication system included in the neighboring base station information if the present signal intensity decreases below a predetermined one, releases the session of the communication system being used, tries to capture the another communication system, selects a first mode to inhibit reselection if information representing the another communication system different from the one being used, is included in the neighboring base station information, and executes reselection to select a second mode not inhibiting reselection if the information is not included in the neighboring base station information.

15 Claims, 6 Drawing Sheets

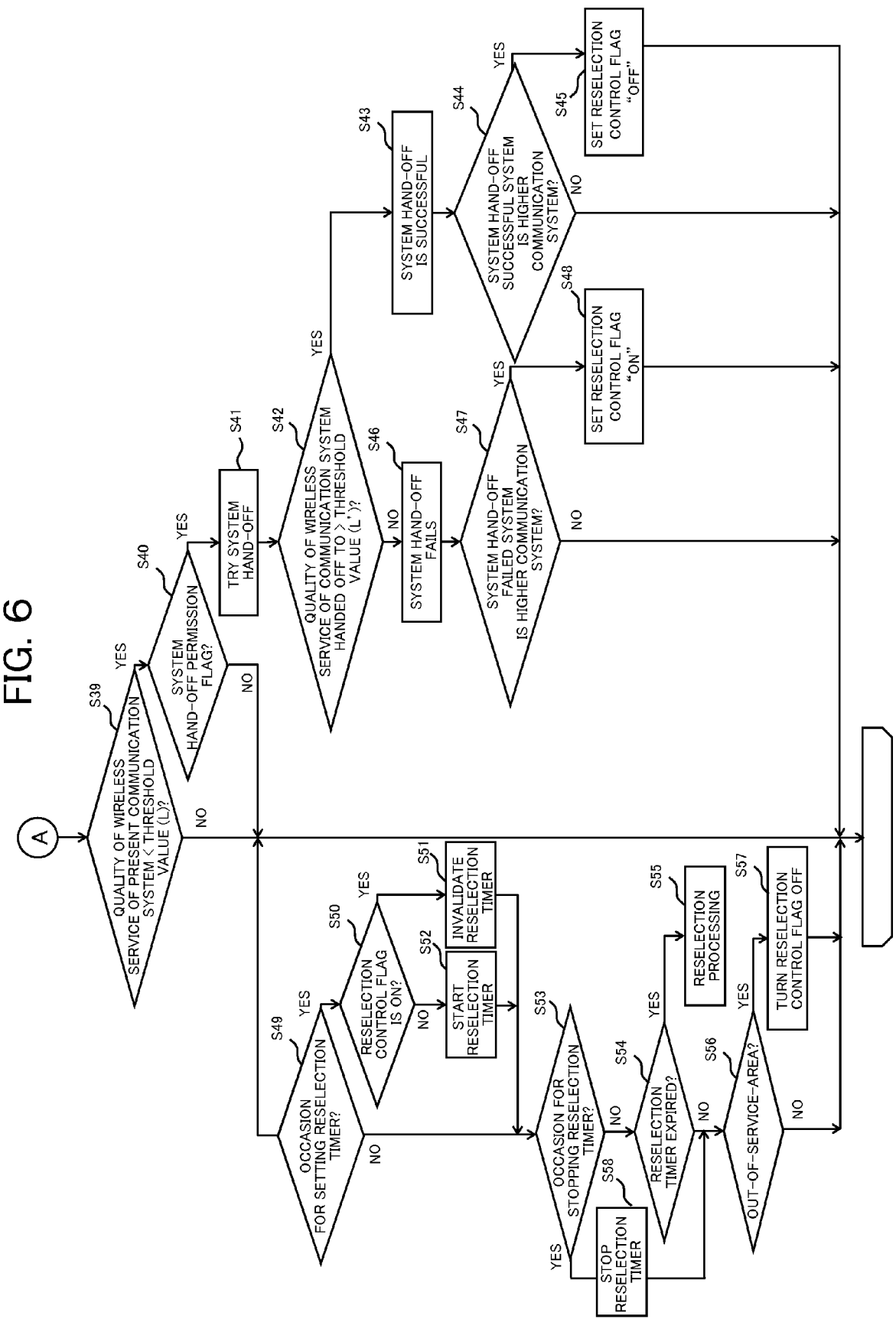

PORTABLE TERMINAL AND ITS COMMUNICATION METHOD, AND WIRELESS NETWORK SYSTEM

CROSS-REFERENCE TO RELATED APPLICATIONS

This application is a U.S. National Phase Application of International Application No. PCT/JP2008/056352 filed Mar. 31, 2008, which claims priority to Japanese Patent Application No. 2007-089766 filed Mar. 29, 2007 the disclosures of which are incorporated herein by reference in their entirety.

TECHNICAL FIELD

The present invention relates to a mobile terminal apparatus capable of standing by while suitably switching among a plurality of communication systems, a wireless network system including a mobile terminal able to handle a plurality of base stations and a plurality of communication systems, and a communication method of a mobile terminal apparatus.

BACKGROUND ART

In a mobile terminal apparatus for connecting with a network through a base station, in order to maintain the quality of communication, it has been required to always select the base station best in signal wave state or traffic environment.

In order to acquire a neighbor cell at a high speed, there is known a mobile terminal apparatus compatible with a W-CDMA (Wideband-Code Division Multiple Access), which receives information concerning neighbor cells from the base station of the cell at which it is currently standing by, and detects the cells according to a priority order contained in the neighbor cell information is known (see, for example, Patent Document 1).

Further, there is known a cellular wireless system notifying information concerning a priority cell by an SMS (Short Message Service) as well (see, for example, Patent Document 2). In this way, the method of reporting information concerning the neighbor base station from the base station is known in CDMA2000 1x as well.

Patent Document 1: Japanese Patent Publication (A) No. 2005-51568
Patent Document 2: Japanese Patent Publication (A) No. 10-257549

DISCLOSURE OF THE INVENTION

Problem to be Solved by the Invention

An object of the present invention is to provide a mobile terminal apparatus capable of increasing the opportunities for standing by for a better communication system while reducing power consumption to realize a longer standby time and able to improve efficiency of the traffic, and a communication method of the same, as well as a wireless network system of the same.

Means for Solving the Problem

A mobile terminal apparatus of a first aspect of the present invention is a mobile terminal apparatus capable of standing by while switching among a plurality of communication systems, comprising: a communication part capable of selecting one of the communication systems and wirelessly communicating with the base station; and a control part changing the communication system used by the communication part and making the communication part perform wireless communication, wherein the control part comprises a neighbor base station information acquisition part using the communication part to obtain neighbor base station information from a base station communicated with at present, a signal strength monitoring part monitoring a signal strength in a communication system used by the communication part, a system hand-off part performing hand-off to a communication system different from the communication system used at present stored in the neighbor base station information when the present signal strength becomes lower than a predetermined amount, a reselection processing part performing reselection processing releasing a session of the communication system used at present at the communication part, attempting acquisition for the plurality of communication systems, and attempting position registration in a successfully acquired communication system, and a reselection inhibition part selecting a first mode of inhibiting the reselection processing, when neighbor base station information received at the neighbor base station information acquisition part includes information indicating a communication system different from the communication system used at present at the communication part, or selecting a second mode not inhibiting the reselection processing when the neighbor base station information does not include the information indicating a communication system.

Further, in the mobile terminal of the present invention, preferably the plurality of communication systems have respectively a priority order, and the control part sets the first mode when the priority order of a different communication system contained in the neighbor base station information is higher than the priority order of the communication system used at present at the communication part.

Further, in the mobile terminal of the present invention, preferably the reselection processing part periodically executes the reselection processing by a predetermined time cycle, and the control part performs updating as to which of the first mode or the second mode is to be set whenever the neighbor base station acquisition part receives the neighbor base station information, judges the set mode when the predetermined cycle comes, and determines whether or not the reselection processing is to be inhibited.

Further, in the mobile terminal of the present invention, preferably the reselection processing part periodically executes the reselection processing by a predetermined time period, and the control part judges the set mode when an update occasion for updating the predetermined period comes, starts the count of the predetermined period when the second mode is set, and does not count the predetermined period when the first mode is set.

Further, in the mobile terminal of the present invention, preferably the update occasion is at least one of a time when the communication part succeeds in a system hand-off or a time when communication over a traffic channel ends.

Further, in the mobile terminal of the present invention, preferably the control part sets the second mode when conditions become ones where the communication part cannot acquire any of the plurality of communication systems.

Further, in the mobile terminal of the present invention, preferably the control part executes the system hand-off processing and sets the first mode when failing in the system hand-off.

Further, in the mobile terminal of the present invention, preferably the control part executes the system hand-off processing and sets the second mode when succeeding in the system hand-off.

A second aspect of the present invention is a communication method of a mobile terminal apparatus capable of standing by while switching among a plurality of communication systems and performing wireless communication with a base station capable of providing neighbor base station information, the method including a neighbor base station information acquisition step of acquiring neighbor base station information from a base station communicated with at present, a signal strength monitoring step of monitoring a signal strength in a communication system being used, a system hand-off step of performing hand-off to a communication system different from the communication system used at present stored in the neighbor base station information when the present signal strength becomes lower than a predetermined amount, a reselection step of releasing a session of the communication system used at present, attempting acquisition for the plurality of communication systems, and attempting position registration by a successfully acquired communication system, and a reselection inhibit step of selecting a first mode of inhibiting the processing of the reselection step, when the neighbor base station information received in the neighbor base station information acquisition step includes information indicating a communication system different from the communication system used at present, or selecting a second mode not inhibiting the processing of the reselection step when the neighbor base station information does not include the information indicating the communication system.

A wireless network system of a third aspect of the present invention has a plurality of base stations; and a mobile terminal apparatus capable of standing by while switching among a plurality of communication systems, wherein the base station can provide neighbor base station information to the mobile terminal apparatus when communicating with the mobile terminal apparatus, the mobile terminal apparatus includes a communication part capable of communication with the base station by selecting one of the communication systems, and a control part changing the communication system used by the communication part and making the communication part perform the wireless communication, and the control part executes neighbor base station information acquisition processing of acquiring the neighbor base station information from the base station communicated with at present by the communication part, signal strength monitor processing of monitoring a signal strength in the communication system used at the communication part, system hand-off processing of performing hand-off to a communication system different from the communication system used at present stored in the neighbor base station information when the present signal strength becomes lower than a predetermined amount, reselection processing of releasing a session of the communication system used at present by the communication part, attempting acquisition for the plurality of communication systems, and attempting position registration by a successfully acquired information system, and reselection inhibit processing of selecting a first mode of inhibiting the reselection processing, when the neighbor base station information received in the neighbor base station information acquisition processing includes information indicating a communication system different from the communication system being used at present at the communication part, or selecting a second mode not inhibiting the reselection processing when the neighbor base station information does not include the information indicating a communication system.

Effects of Invention

According to the present invention, it is possible to increase the opportunities for standing by for a better communication system while reducing power consumption for realizing a longer standby time.

BRIEF DESCRIPTION OF THE DRAWINGS

FIG. 6 is a second flow chart showing the operation of a mobile terminal apparatus according to a second embodiment of the present invention.

EXPLANATION OF NOTATIONS

Figure 1:
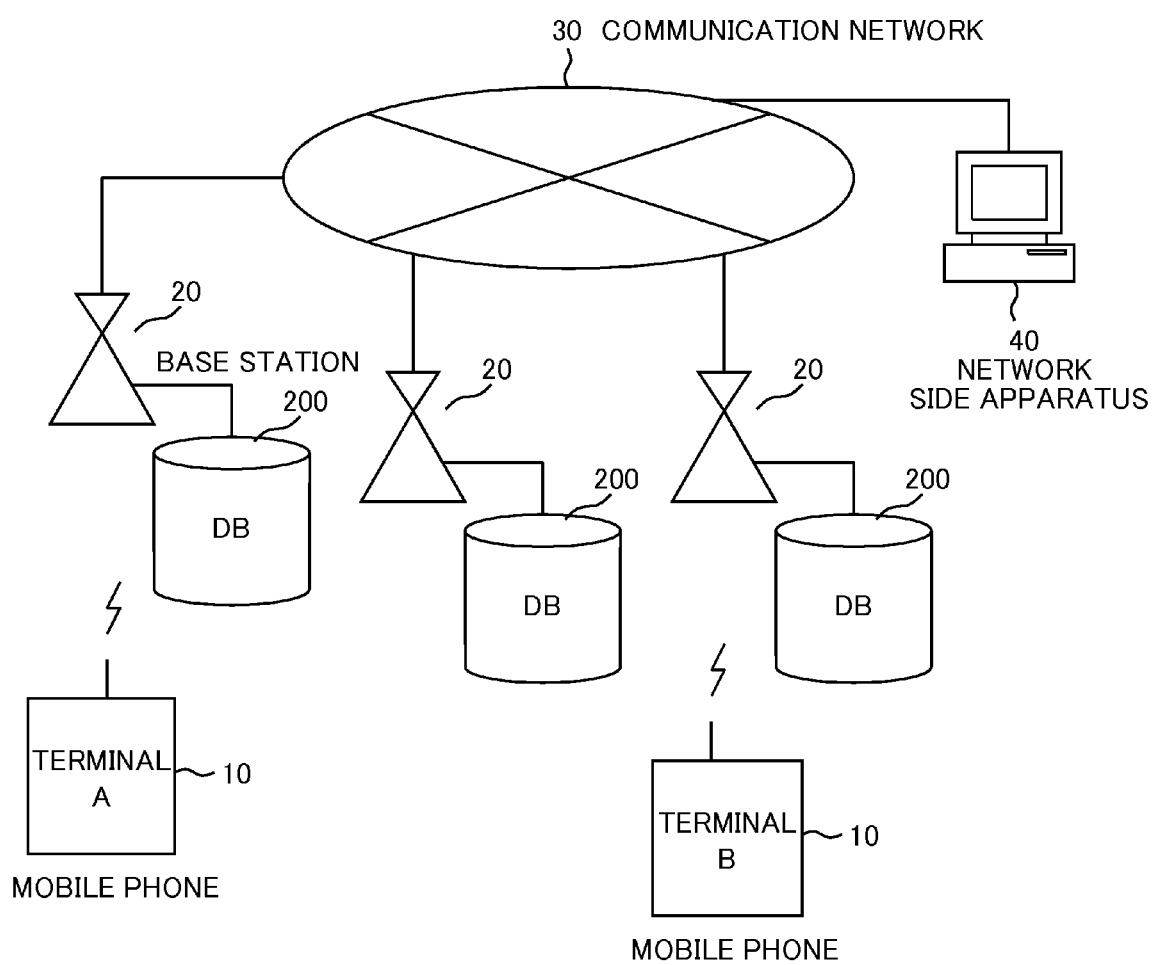
FIG. 1 is a diagram showing an example of the system configuration of a wireless network system according to an embodiment of the present invention.

1 . . . communication part, 2 . . . operation part, 3 . . . audio processing part, 6 . . . display part, 7 . . . memory part, 8 . . . control part, 10 . . . mobile phone, 81 . . . neighbor base station list acquisition part, 82 . . . signal strength monitoring part, 83 . . . system hand-off processing part, 84 . . . reselection processing part, 85 . . . reselection inhibit processing part, 86 . . . neighbor base station list, 87 . . . reselection inhibit flag, and 88 . . . system hand-off permission flag.

BEST MODE FOR CARRYING OUT THE INVENTION

Recently, mobile terminal apparatuses capable of standing by at a plurality of frequency bands (communication systems) have been appearing.

Namely, mobile terminal apparatuses are also being required to select the base station best in signal state or traffic environment. It is proposed to change the current acquired base station by performing hand-off using the neighbor base station information explained above.

"Hand-off" means the function of changing base stations (communication channels) and includes two types: hand-off not accompanied with a frequency change and hand-off accompanied with a frequency change. Hand-off not accompanied with a frequency change is hand-off performed without switching frequencies (for this reason, hand-off is not possible in a case where two base stations cannot provide service using the same frequency or the like), while hand-off accompanied with a frequency change is hand-off performing while switching frequencies while maintaining the session with the base station communicated with immediately before the switching of base stations.

Note that, in CDMA, there are different systems of a band class 3 (800 MHz band), a band class 6 (2 GHz band), and a band class 0 (new 800 MHz band). These differ not only in the frequency band, but also in the version of the protocol in many cases, therefore they are called "systems". In the following explanation, these systems will be referred to as "communication systems".

In this regard, in the case of hand-off not accompanied with a frequency change, the base stations are changed while maintaining the session, so cooperation between the current acquired base station and the destination base station is necessary.

For this reason, the network side has to study the relationship of the base stations in advance from the stage of building the infrastructure. Accordingly, it suffers from the disadvantages of difficulty of support in regions where base stations are densely concentrate and regions where infrastructure is being built. It could not be said that complete support was possible.

Further, as specifications in Japan, an 800 MHz band (band class 3, present 800 MHz band) infrastructure has been set up. Traffic has become congested. Therefore, a newly allocated 800 MHz band (band class 0, new 800 MHz band) and a 2 GHz high frequency band (band class 6) infrastructures are being newly set up. In the case of such a tri-band compatible environment, only naturally the new frequency band would become more advantageous traffic wise. Therefore, it is desirably set with a higher degree of priority.

However, infrastructure-wise, the band class 3 is overwhelmingly stabler in coverage area. Therefore, once standing by at the frequency band of the band class 3, the communication terminal ends up operating without any problem at all by just soft hand-off at this frequency band, so unless there is an opportunity for the above explained hand-off not accompanied with a frequency change, the terminal will never be able to change to standby at the frequency band of the band class 6 or 0.

In order to avoid such a problem, the processing called "reselection" is known. "Reselection" means processing once releasing the standby state at a frequency in a state standing by at any frequency (session release), acquiring another frequency band having a higher degree of priority, and registering the position at that frequency band if the frequency band having a high degree of priority is nearby and thereby changing the current acquired frequency band to the higher frequency band (hereinafter referred to as the "higher communication system").

The reselection is usually performed in every predetermined period at a time interval counted by a reselection timer. In this case, the reselection processing will always occur whenever the timer completes the count, therefore useless power consumption will occur in an area where there is no higher communication system defined by the PRL (Preferred Roaming List) nearby.

However, unless actually attempting the acquisition, it cannot be judged whether or not there is a higher communication system, therefore, to prolong battery life, the only option was to reduce the occasions of reselection.

When reselection is carried out, a higher communication system is searched for, and the result is there is no higher communication system or there is, but the signal is very weak, etc., the process ends up finishing with just the original communication system reacquired.

In particular, this disadvantage becomes more remarkable in the case of a terminal apparatus routinely used out of the coverage area of a higher communication system.

In such a case, the reselection operation ends up becoming a useless operation just consuming the battery power. Therefore, desirably the reselection operation itself is inhibited (restricted) in a case where even when reselection is carried out, it would be ineffective.

Alternatively, it may be that there is a higher communication system, but unstable, and, at the time of reselection, an incoming call will end up being missed even at a signal strength level enabling acquisition.

In such a case, not only would there be the problem of an incoming call not being able to be received, but also an unstable higher communication system would be selected from among stable lower communication systems and, in the process of moving out of the service area of the higher communication system, the number of bars of the "antenna pict" of the terminal would unstably increase or decrease. Accordingly, this would end up appearing as interference to the user.

Below, embodiments of the present invention will be explained with reference to the drawings.

FIG. 1 is a diagram showing an example of the system configuration of a wireless network system according to an embodiment of the present invention. Here, the wireless network system is constructed by applying known broadcast SMS technology.

In FIG. 1, a mobile terminal apparatus constituted by a mobile phone 10 is connected with a network side apparatus 40 managed and run by a carrier through a communication network 30 including a base station (base station apparatus 20).

The base station apparatus 20 is provided with database (DB 200) holding broadcast information for individually reporting neighbor base station information and other information. Further, this DB 200 is rewritten by the network side apparatus 40 through the communication network 30.

Further, the mobile terminal apparatus of the present embodiment constituted by the mobile phone 10, as will be explained in detail later, has a communication part able to select one of the communication systems for wireless communication with a base station.

Further, the mobile phone 10 has the following functions. First, it has a neighbor base station information acquisition function of using the communication part to acquire neighbor base station information from the currently communicating base station. Further, it has a signal strength monitor function of monitoring the signal strength in the communication system being used by the communication part. Further, it has a system hand-off function of performing hand-off to a communication system different from the communication system being used at present stored in the neighbor base station information when the present signal strength becomes lower than a predetermined amount. Further, the mobile phone has a reselection function of releasing the communication system being used at present at the communication part, trying acquisition with respect to a plurality of communication systems including other communication systems, and attempting position registration.

Further, the mobile phone 10 includes a reselection inhibit (restriction) function of setting a state inhibiting (restricting) the reselection processing when the neighbor base station information received by the neighbor base station information acquisition processing includes information indicating a communication system different from the communication system being used at present at the communication part (setting a first mode) and setting a state not inhibiting the reselection processing when the neighbor base station information does not include this information (setting a second mode).

Below, the mobile phone 10 as a mobile terminal apparatus of the present embodiment will be explained in detail.

Figure 2:
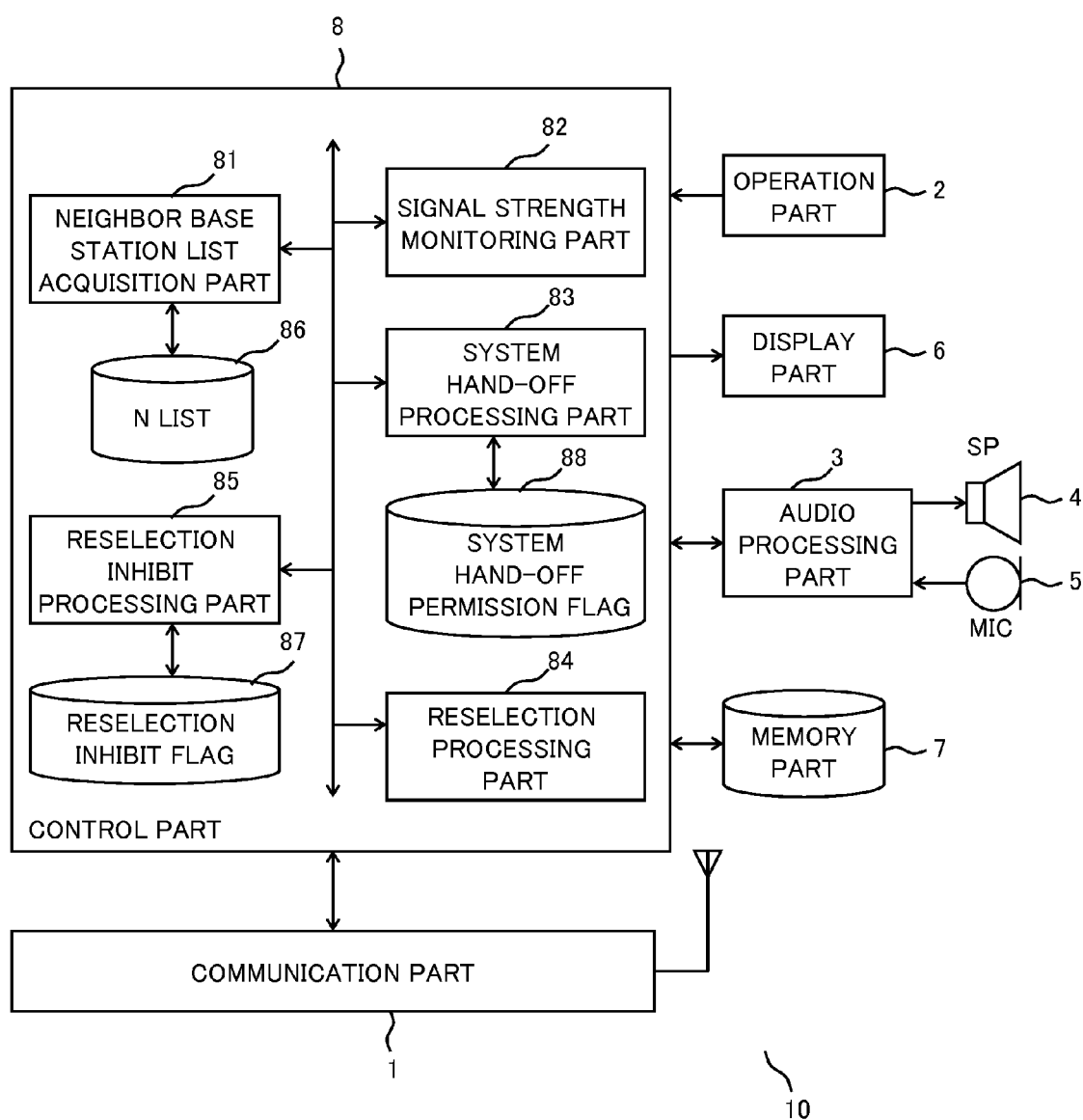
FIG. 2 is a block diagram showing an example of the configuration of a signal processing system of a mobile terminal apparatus according to an embodiment of the present invention.

FIG. 2 is a block diagram showing an example of the configuration of a signal processing system of the mobile terminal apparatus according to an embodiment of the present invention. Here, as the mobile terminal apparatus, the mobile phone 10 is exemplified.

As shown in FIG. 2, the mobile phone 10 is connected with a network side apparatus including a base station (base station 20 and BSMS server 40 shown in FIG. 1) through a communication network (30 in FIG. 1), can acquire a plurality of communication systems, and communicates according to a predetermined protocol by the communication system acquired with the network side apparatus.

The mobile phone 10 is configured by a communication part 1, operation part 2, audio processing part 3, speaker (SP) 4, microphone (MIC) 5, display part 6, memory part 7, and control part 8.

The communication part 1 acquires a plurality of communication systems and performs wireless communication with a base station 20 connected to the communication network 30 according to the CDMA2000 1x or EVDO (Evolution-Data Optimized/only) communication protocol.

Note that, EVDO communication is higher in communication speed than 1x communication. 1x communication, unlike tEVDO communication, has the feature of also supporting audio communication in addition to data communication.

The operation part 2 has, for example, a power key, a speak key, number keys, letter keys, direction keys, a decision key, a transmission key, and other keys to which various functions are assigned. When these keys are operated by the user, the operation part 2 generates signals corresponding to those operation contents and inputs these as an instruction of the user to the control part 8.

The audio processing part 3 performs the processing of the audio signal output from the speaker 4 and audio signal input at the microphone 5.

Namely, the audio processing part 3 amplifies audio input from the microphone 5, performs analog-to-digital conversion to convert the signal to digital audio data, further applies encoding or other signal processing, and outputs the result to the control part 8.

Further, the audio processing part 3 applies decoding, digital-to-analog conversion, amplification, or other signal processing to the audio data supplied from the control part 8 to convert the signal to an analog audio signal and outputs the result to the speaker 4.

The display part 6 is configured by using, for example, a liquid crystal display panel, an organic EL (Electro-Luminescence) panel, or other display device and displays an image in accordance with a video signal supplied from the control part 8.

For example, the display part 6 displays a phone number of a destination at the time of a send operation, a phone number of the other party at the time of reception, contents of received mail and transmitted mail, the date, time, remaining battery power, success of a transmission operation, a standby screen, and other various information and images.

The memory part 7 stores various types of data utilized for processing at the control part 8.

The memory part 7 holds, for example, programs provided in the control part 8, an address book for managing personal information such as phone numbers and e-mail addresses of other parties, an audio file for playing back an incoming call sound and an alarm sound, an image file for the standby screen, various types of setting data, temporary data utilized in the processing process of the programs, and so on.

The above memory part 7 is configured by, for example, a nonvolatile memory device (nonvolatile semiconductor memory, hard disc device, optical disc device, etc.), a random accessible memory device (for example, SRAM or DRAM), or the like.

The control part 8 centrally controls the entire operation of the mobile phone.

Namely, the control part 8 controls operations of blocks explained above (transmission/reception of signals at the communication part 1, input/output of audio at the audio processing part 3, display of an image in the display part 6, and so on) so that various types of processing of the mobile phone (speech carried out through a line exchange network, preparation and transmission/reception of e-mails, viewing of Internet Web (World Wide Web) sites, and so on) are executed in a suitable sequence in accordance with the operation of the operation part 2.

The control part 8 is provided with a computer (microprocessor) executing processing based on a program (operating system, application program etc.) stored in the memory part 7 and executes the processing explained above according to the sequence instructed in this program. Namely, the control part 8 sequentially reads command codes from the operating system, application program, or other program stored in the memory part 7 to execute the processing.

The control part 8 has a function of changing the communication system used by the communication part 1 and making the communication part 1 perform the wireless communication.

Specifically, the control part has the following functions: neighbor base station information acquisition processing of using the communication part 1 to obtain the neighbor base station information (neighbor List: hereinafter referred to as an "N list 86") from the current acquired base station; signal strength monitor processing of monitoring the signal strength at the communication system being used at the communication part 1; system hand-off processing of performing hand-off to a communication system different from the communication system used at present stored in the N list when the present signal strength becomes lower than a predetermined amount; reselection processing of releasing the session of the communication being used at present at the communication part 1, trying acquisition with respect to other communication systems, and attempting position registration; and reselection inhibit processing of setting a state inhibiting the reselection processing when the N list received in the neighbor base station information acquisition processing includes information indicating a communication system different from the communication system being used at present at the communication part 1 and setting a state not inhibiting the reselection processing when not including it.

Corresponding to the above, the control part 8 is configured by, as shown functionally in FIG. 2, a neighbor base station list acquisition part 81, signal strength monitoring part 82, system hand-off processing part 83, reselection processing part 84, and reselection inhibit processing part 85.

Further, although not explained in detail, the control part 8 performs processing to register the position at the successfully acquired communication system when succeeding in the acquisition and stand by at the reselected base station.

The neighbor base station list acquisition part 81 has a function of executing the neighbor base station list acquisition processing for obtaining the N list 86 from the base station being communicated with at present by the communication part 1.

The signal strength monitoring part 82 has a function of executing the signal strength monitor processing for monitoring the signal strength in the communication system being used at the communication part 1.

The system hand-off processing part 83 has a function of executing the system hand-off processing for performing hand-off to a communication system different from the communication system used at present stored in the N list 86 when the present signal strength becomes lower than a predetermined amount. For this reason, a system hand-off permission flag 88 is set to ON or OFF.

The reselection processing part 84 has a function of executing the reselection processing for releasing the session of the communication system being used at present at the communication part 1, trying acquisition with respect to the other communication systems, and attempting position registration.

The reselection inhibit processing part 85 sets the first mode of inhibiting the reselection processing when the N list received by the neighbor base station list acquisition part 81 includes information indicating a communication system different from the communication system being used at present at the communication part 1. Conversely, the reselection inhibit processing part sets the second mode not inhibiting the reselection processing when it does not include it. Further, the reselection inhibit processing part has a function of executing the reselection inhibit processing for setting the reselection inhibit flag 87 to ON or OFF as the first mode or second mode.

Note that, the above N list 86, reselection inhibit flag 87, and system hand-off permission flag 88 are stored assigned to predetermined regions of the memory part 7.

Below, the operation of the mobile terminal according to the embodiment of the present invention will be explained.

Here, as conditions for inhibition of reselection, assume two of (1) a case where a base station of the lower communication system has reported neighbor base station information of a higher communication system and (2) a case where the system hand-off from the lower communication system to the higher communication system fails.

Further, as conditions for release in the state where the reselection is inhibited (first mode), assume the following: (1) a case of detection that a base station of a lower communication system has not reported neighbor base station information of a higher communication system and a case where a lower communication system is out of the service-area (in this state, the system hand-off from a lower communication system to a higher communication system succeeds). Hereinafter, the former (1) will be explained in detail as a first embodiment, and the latter case will be explained in detail as a second embodiment.

First Embodiment

Figure 3:
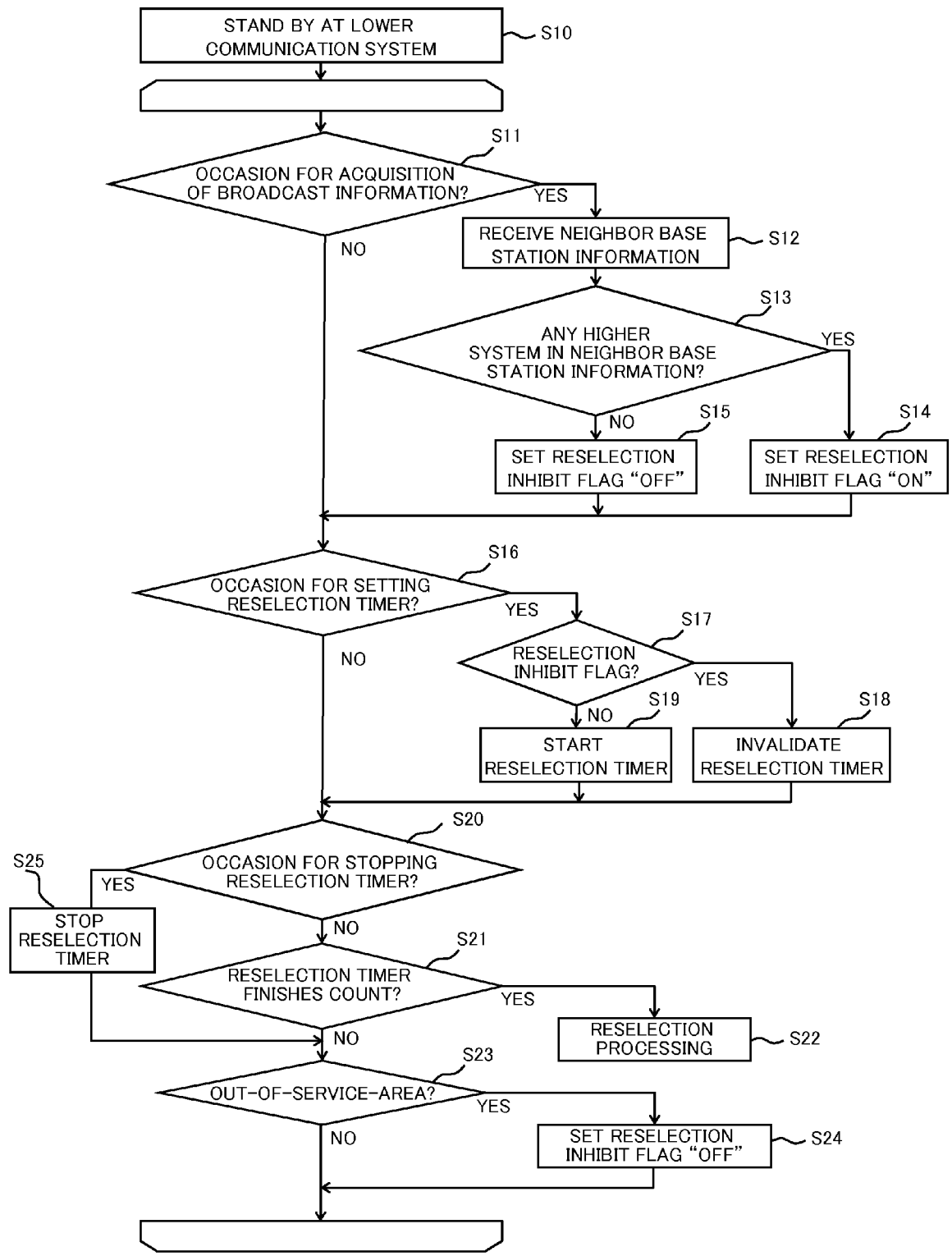
FIG. 3 is a flow chart showing an operation of a mobile terminal apparatus according to a first embodiment of the present invention.

FIG. 3 is a flow chart showing a basic operation of a mobile terminal according to a first embodiment of the present invention.

Here, in a state standing by at a lower communication system, when the base station has reported neighbor base station information of a higher communication system and a signal quality of the lower communication system falls, the higher system may be switched to by system hand-off. Further, by preventing unsuccessful reselection operations to higher communication systems, unstable factors are eliminated and the stability as a network system is stressed.

The operation of the mobile terminal apparatus according to the first embodiment of the present invention shown in FIG. 2 will be explained in detail with reference to the flow chart shown in FIG. 3.

In FIG. 3, assume that the mobile terminal apparatus (control part 8) is in the standby state at the lower communication system (step S10).

First, the control part 8 judges the timing to determine whether or not it is time to receive broadcast information from the base station (step S121). For example, when the current acquired base station is changed or the power is turned on etc. and the terminal enters a standby state from an out-of-service state, it is determined that it is time to receive broadcast information.

Here, when it is judged that it is time to receive broadcast information (step S11 "Yes"), the neighbor base station list acquisition part 81 of the control part 8 receives the N list contained in the broadcast information of the base station (step S12).

Further, the reselection processing part 84 refers to the N list, judges if the N list includes a higher communication system, and transfers the result to the reselection inhibit processing part 85 (step S13).

When it is judged that the N list includes a higher communication system, the reselection inhibit processing part 85 sets the reselection inhibit flag 87 to ON (first mode) in order to inhibit the execution of the reselection processing by the reselection processing part 84 (step S14). When it is judged that a higher communication system is not included, the reselection inhibit processing part 85 sets the reselection processing flag to OFF (second mode) (step S15).

Next, the reselection processing part 84 judges the timing to determine whether it is time to set a built-in reselection timer (step S16). The reselection processing part 84 refers to the reselection inhibit flag 87 when it is time to set the reselection timer (step S16 "Yes"), for example, immediately after a lower communication system enters standby (step S17).

Here, when the reselection inhibit flag 87 is set to ON (first mode) and thereby inhibition of the reselection processing has become valid, the reselection processing part 84 does not set the reselection timer (step S18). Conversely, when the reselection inhibit flag is set to OFF (second mode) and thereby the reselection inhibition has become invalid, the reselection timer is set and the timer is started (step S19).

The reselection processing part 84, next, judges the timing to determine if the time has come to stop the reselection timer (step S20). Here, when standing by the uppermost communication system or otherwise judging that the time has come for stopping the reselection timer (step S20 "Yes"), the reselection timer is stopped (step S25), then it is judged whether the terminal is out of the service area (step S23).

On the other hand, when it is judged that the time for stopping the reselection timer has not come (step S20 "No"), the reselection processing part 84 further judges whether or not the reselection timer has reached the end of its count (step S21).

Here, when the reselection timer has reached the end of its count, the reselection processing part 84 executes the reselection processing (step S22). When the reselection timer has not reached the end of its count (step S21 "No"), it further judges whether or not the terminal is out of the service area (step S23). Here, when the terminal is out of the service area (step S23 "Yes"), the reselection inhibit flag 87 is set to OFF (second mode) (step S24). Then, the routine returns to the broadcast information reception timing judgment processing of S11 whereafter the operations of steps S11 to S24 are repeatedly executed.

Figure 4:
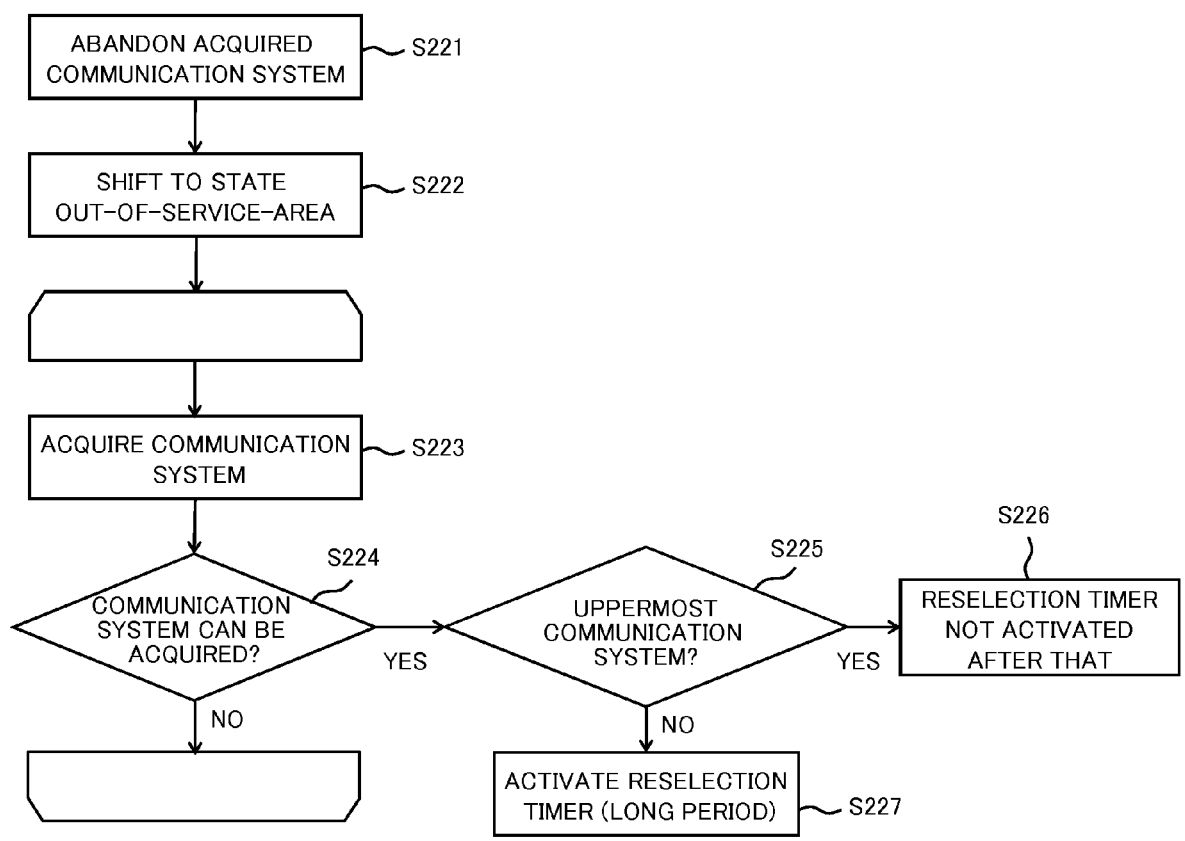
FIG. 4 is a flow chart showing a concrete processing routine of reselection processing in FIG. 3.

The detailed routine of the above reselection processing (step S22) is shown in the flow chart of FIG. 4.

In FIG. 4, the reselection processing part 87 first abandons the currently acquired communication system (step S221) and assumes that the terminal has moved out of the service area (step S222).

Further, the reselection processing part 84 instructs the communication part 1 to acquire a system from the uppermost communication system found according to the degree of priority described in the PRL (step S223).

Next, the reselection processing part 84 waits for a response from the communication part 1 and judges whether or not the acquisition of the uppermost communication system has succeeded (step S224). Here, when the acquisition fails (step S224 "No"), the routine returns to the processing of step S223, searches through the PRL again, and instructs the communication part 1 to acquire the communication system having the degree of priority next to the highest order.

The processing of steps S223 and S224 described above is repeated until finishing trying to acquire all communication systems or a predetermined time passes. When a communication system can be acquired (step S224 "Yes"), it is judged whether or not this acquired communication system is the uppermost communication system (step S225). Here, when the uppermost communication system (step S225 "Yes"), the reselection timer is not subsequently activated (step S226), while when not the uppermost communication system (step S225 "No"), the reselection timer is activated (step S227).

In the case of reselection, different from system hand-off, the session of the previously waited at communication system is released, then standby at another communication system is tried. For this reason, when acquisition is not achieved even when the processing of steps S323 and S324 is repeated for all systems for a predetermined time, it is judged that the reselection has failed and the above routine is ended.

Consider the case, as explained above, according to the present first embodiment, the base station has reported neighbor base station information of a higher system in the state standing by at a lower communication system. In such a case, when the signal conditions of the lower communication system become bad, the higher system may be able to be switched to by system hand-off. For this reason, unsuccessful reselection operations to the higher communication system can be prevented and thereby unstable factors can be eliminated.

Accordingly, according to the first embodiment, the opportunity for standing by at the higher communication system is increased by reliably performing the reselection processing while reducing the power consumption in order to realize a long standby time. Further, the traffic efficiency can be improved.

Second Embodiment

Figure 5:
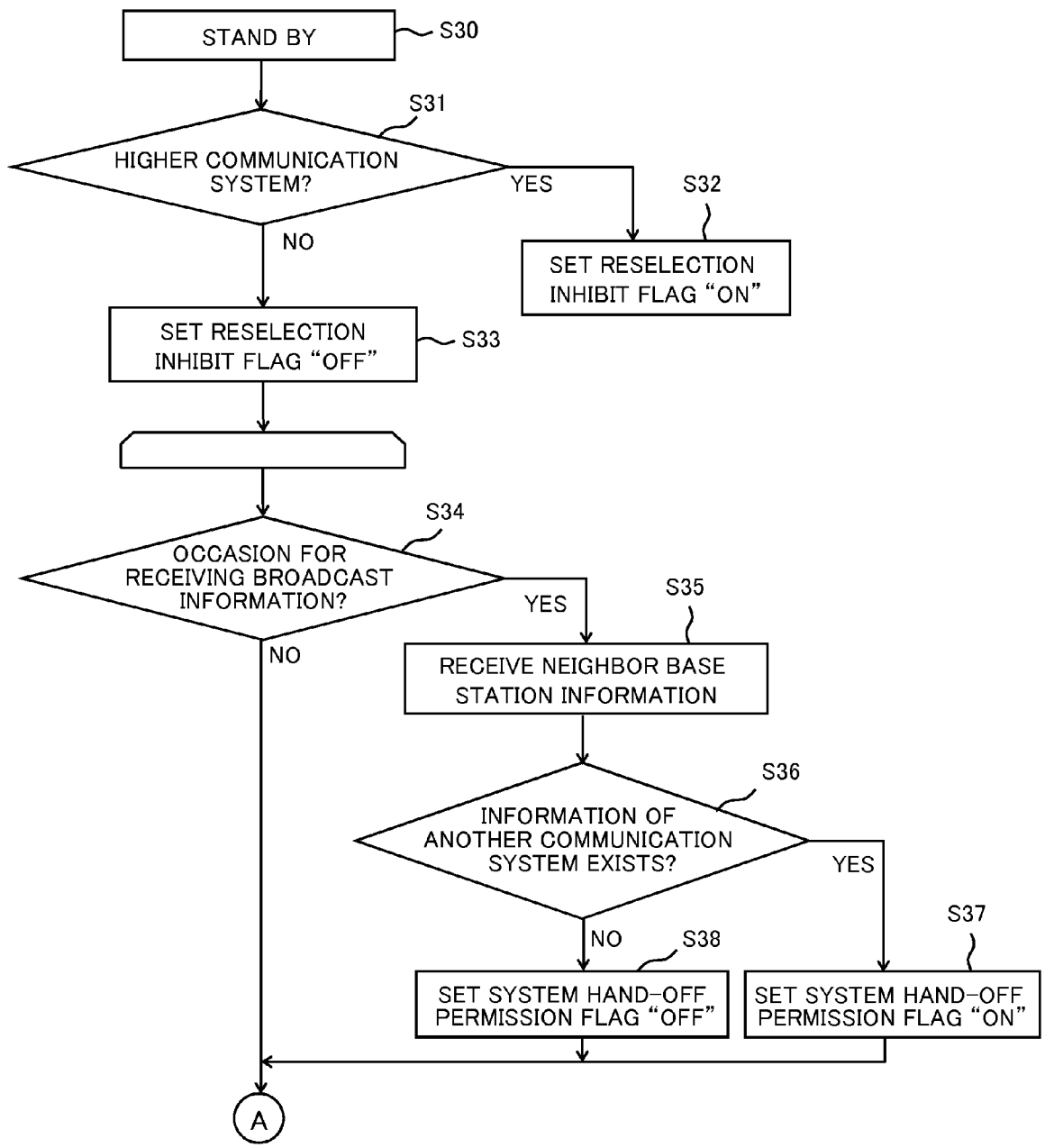
FIG. 5 is a first flow chart showing the operation of a mobile terminal apparatus according to a second embodiment of the present invention.

FIG. 5 and FIG. 6 are flow charts showing the basic operation of a mobile terminal apparatus according to a second embodiment of the present invention.

Here, when an attempt of system hand-off from a lower communication system to a higher communication system fails and the original lower communication system is returned to, it is judged that the signal conditions of the higher communication system are poor and there is a good change that reselection for the higher communication system will similarly fail. Reselection processing is prevented so as to eliminate this unstable factor and stress the stability as the communication terminal apparatus and network system.

Below, the operation of the mobile terminal apparatus according to the second embodiment of the present invention will be explained in detail with reference to the flow chart shown in FIG. 5 and FIG. 6.

First, in the flow chart of FIG. 5, assume that the mobile terminal apparatus (reselection processing part 84 of the control part 8) is in the standby state (step S30). First, it is judged whether or not the current acquired communication system is a higher system (step S31).

Here, when it is a higher system (step S31 "Yes"), the reselection inhibit processing part 85 sets the reselection inhibit flag 87 to ON (sets the first mode) (step S32) in order to inhibit the execution of the reselection processing by the reselection processing part 84, while when it is not a higher communication system (step S31 "No"), the restriction inhibit processing part sets the reselection processing flag to OFF (sets the second mode) (step S33).

The system hand-off processing part 83 judges the timing to determine whether or not the time has come for receiving broadcast information from the base station (step S34). For example, a case where the current acquired base station has changed or the power has been turned on etc. and the terminal apparatus enters the standby state from the out of service state is determined as the timing for receiving broadcast information. Here, when it is judged that the time has come for receiving broadcast information (step S34 "Yes"), the neighbor base station list acquisition part 81 of the control part 8 receives the N list contained in the broadcast information of the base station (step S35).

Further, the system hand-off processing part 83 refers to the N list and judges whether or not another communication system is included in this N list (step S36).

When it is judged that another communication system is included in the N list (step S46 "Yes"), the system hand-off processing part 83 sets the system hand-off permission flag 88 to ON (sets the first mode) in order to indicate that the hand-off is permitted (step S37).

When it is judged that another communication system is not included (step S36 "No"), the system hand-off processing part 83 sets the system hand-off permission flag to OFF (sets the second mode) in order to indicate that the system hand-off is not permitted (step S38).

As the information from the base station required for the system hand-off, there are the frequency information, base station identifiers, etc. of the neighbor systems. For example, in the case of the CDMA 2000 system, the band classes, frequency channels, and PN codes of the base stations are included.

The mobile phone 10 autonomously performs the system hand-off based on the information if required (accompanied with deterioration of the quality of wireless service of the system receiving service at present). As described above, system hand-off is a method of synchronization with another base station in a short time while keeping the standby state. In this case, the power consumption and a risk of loss of incoming calls of the mobile phone 10 can be kept smaller than with reselection.

In the flow chart of FIG. 6, at the start of the system hand-off processing by the system hand-off processing part 83, the signal strength monitoring part 82 judges whether or not the quality of wireless service of the communication system being used at present by the communication part 1 is less than a threshold value (L) (step S49) and transfers the result to the system hand-off processing part 83.

When the result of the above threshold value judgment is that the quality of the wireless service of the communication system is less than the threshold value (L) (step S39 "Yes"), the system hand-off processing part 83 refers to the system hand-off permission flag 88 and judges whether or not the hand-off is permitted (step S40). When hand-off is not permitted (step S40 "No") or when the result of the judgment of the threshold value is that the quality of wireless service of the communication system is the threshold value (L) or more (step S39 "No"), the routine returns to the processing of step S44.

When hand-off is permitted (step S40 "Yes"), the system hand-off processing part 83 controls the communication part 1 to attempt the system hand-off (step S41). Further, the signal strength monitoring part 82 judges whether or not the quality of wireless service of the communication system to be handed off is equal to the threshold value (L') or more, based on the measured signal strength (step S42).

Here, if the quality of wireless service of the communication system to be handed off is the threshold value (L') or more (step S42 "Yes"), it is deemed that the system hand-off was successful (step S43), and it is judged whether or not this communication system successfully to be handed off is a higher communication system (step S44).

In the case of hand-off to a higher communication system (step S44 "Yes"), the system hand-off processing part 83 refers to the memory part 7 and sets the reselection inhibit flag 87 to OFF (step S45).

On the other hand, when the judgment of the threshold value at step S42 is that the quality of wireless service of the communication system handed off to is less than the threshold value (L') (step S42 "No"), it is deemed that the hand-off failed (step S46). Further, it is further judged whether or not this communication system failed in hand-off is a higher communication system (step S47).

Further, when hand-off to the higher communication system fails (step S47 "Yes"), the system hand-off processing part 83 turns ON the reselection inhibit flag 87, that is, refers to the memory part 7 and sets the first mode (step S48).

Note that, when a higher communication system is not handed off to (step S44 "No") and when hand-off to a higher communication system succeeds (step S47 "No"), the routine returns to the processing of step S34 whereafter the processing up to the following S48 is repeatedly executed.

On the other hand, the reselection processing part 84 judges the timing to determine whether the time has come for setting the built-in reselection timer (step S49).

For example, immediately after entering the standby state at a lower communication system or otherwise when it is judged that the time has come for setting the reselection timer (step S49 "Yes"), the reselection inhibit flag is referred to (step S50).

Here, when the reselection inhibit flag 87 is set to ON and therefore inhibition of the reselection processing has become valid (step S50 "Yes"), the reselection timer is not set and the operation is invalidated (step S51) and the reselection flag is set to OFF (the second mode setting). When the reselection inhibition has become invalid (step S50 "No"), the reselection processing part 84 sets the reselection timer and starts monitoring of the timer (step S52).

The reselection processing part 84, next, judges the timing to determine whether the time has come to stop the reselection timer (step S53). Here, when standing by at the uppermost communication system or otherwise it is judged that the time has come for stopping the reselection timer (step S53 "Yes"), the reselection timer is stopped (step S58), then it is judged if the terminal is out of the service area (step S66).

On the other hand, when it is judged that the time has not come for stopping the reselection timer (step S53 "No"), the reselection processing part 84 further judges whether or not the reselection timer has reached the end of its count (step S54).

Here, when the reselection timer has reached the end of its count, the reselection processing part 84 executes the reselection processing (step S55). When the reselection timer has not reached the end of its count (step S54 "No"), it further judges whether or not the terminal is out of the service area (step S56)

Here, if out of the service area (step S56 "Yes"), the reselection inhibit flag 87 is set to OFF (second mode setting) (step S57). Further, the routine returns to the broadcast information reception timing judgment processing of step S34, whereafter the operations of steps S12 to S57 are repeatedly executed.

As explained above, according to the mobile terminal apparatus according to the second embodiment of the present invention, when an attempt of system hand-off from a lower communication system to a higher communication system fails and the original lower communication system is returned to, it is judged that the signal conditions of the higher communication system are poor and even if similarly attempting reselection to the higher communication system, the possibility of failure would be high. Further, by not performing the reselection processing, unstable elements can be eliminated.

Accordingly, according to the present second embodiment, the mobile terminal apparatus and network system reliably performing the reselection processing while reducing the power consumption in order to realize a longer standby time to thereby increase the opportunity for standing by at a higher communication system and capable of improving traffic efficiency can be provided.

Namely, due to infrastructure, the cases where system hand-off is covered are very limited. For example, consider a case of newly laying base stations designed for high priority communication system in a state of infrastructure able to handle only previously established low priority order communication systems. In this case, the new base stations have to carry old base station information in the neighbor base station information. Not only that, the neighbor base station information reported at old base stations has to be modified to include the type of the communication systems of the new base stations. In addition, such modifications must be made at all of the old base stations.

That is, supporting system hand-off will require great cost in infrastructure. Accordingly, even when base stations of old communication systems and base stations of new communication systems are actually mixed, the neighbor base station information on the old base station side in many cases will not describe the new base stations.

According to the present invention, when neighbor base station information describes base stations of new communication systems, this can be covered by system hand-off, so reselection is not carried out, but when not described, system hand-off cannot be carried out, so the reselection is enabled. By this configuration, useless reselection operations can be reduced.

Further, no major modifications are required on the network side, so infrastructure can be quickly built.

By inhibiting the reselection, the following effects are exhibited.

In an area with no signal of a higher communication system, attempts at reselection will invite an increase in power consumption. However, according to this embodiment, by inhibiting (restricting) the reselection, the power consumption can be reduced. Further, when the signal conditions of a higher communication system is poor, attempts at reselection will invite an increase of the power consumption due to an increase of processing load at the time of the acquisition operation. However, according to this embodiment, by inhibiting the reselection, the power consumption can be reduced.

Further, when the mobile terminal apparatus cannot access a higher communication system, an attempt at reselection will cause a drop in continuity when sending or receiving a call or registering position after successful reselection. However, according to this embodiment, by inhibiting the reselection, a drop in continuity when sending or receiving a call or registering position can be prevented. Further, when the signal environment of a higher communication system is unstable, an attempt at reselection will invite a drop in the call reception rate after successful reselection. However, according to this embodiment, by inhibiting the reselection, the drop of the call reception rate can be prevented.

Further, when shifting to a weak signal or unstable higher communication system, the "antenna pict" showing the signal conditions will be displayed low or will unstably fluctuate, therefore the user will sometimes become worried about the losing service. However, by inhibiting the reselection to such a higher communication system, the user can be prevented from being made to worry about this.

Note that, according to the above embodiment of the present invention described above, the invention can be applied to all mobile terminals compatible with not only CDMA2000 but the W-CDMA and GSM/UMTS (Universal Mobile Telecommunication System/Global System for Communications). Further, the mobile phone 10 was exemplified as a mobile terminal apparatus, but the invention is not limited to the mobile phone 10 and may be applied to a PDA (Personal Digital Assistants), game machine, etc. in the same way.

Further, the functions of the blocks of the mobile terminal apparatus according to the embodiments of the present invention may all be realized by software or a portion thereof may be realized by hardware.

For example, the data processing in the neighbor base station list acquisition part 81, signal strength monitoring part 82, system hand-off processing part 83, reselection processing part 84, and reselection inhibit processing part 85 which configure the control part 8 may be realized by one or several programs on a computer or a portion thereof may be realized by hardware. Further, the N list 86, reselection inhibit flag 87, and system hand-off permission flag 88 used at this time are stored in the memory part 7.

The invention claimed is:

1. A mobile terminal apparatus capable of standing by while switching among a plurality of communication systems, wherein each one of the plurality of communication systems operates in a frequency band different from at least one other of the plurality of communication systems, comprising:

a communication part capable of selecting a first one of the plurality of communication systems and wirelessly communicating with a base station of the first one of the plurality of communication systems; and a control part capable of changing the first one of the plurality of communication systems used by the communication part and making the communication part perform wireless communication, wherein the control part comprises a neighbor base station information acquisition part using the communication part to obtain neighbor base station information from the base station of the first one of the plurality of communication systems, a signal strength monitoring part monitoring a signal strength from the base station of the first one of the plurality of communication systems used by the communication part, a system hand-off part performing hand-off to a base station of a second one of the plurality of communication systems stored in the neighbor base station information when the present signal strength becomes lower than a predetermined amount, wherein the second one of the plurality of communication systems is different from the first one of the plurality of communication systems, a reselection processing part performing reselection processing to release a session of the first one of the plurality of communication systems, attempt acquisition for the plurality of communication systems, and attempt position registration in a successfully acquired second one of the plurality of the communication systems, wherein the reselection processing is not a handover processing, and a reselection inhibition part selecting a first mode of inhibiting the reselection processing, when neighbor base station information received at the neighbor base station information acquisition part includes information indicating a base station of the second one of the plurality of communication systems, or selecting a second mode not inhibiting the reselection processing when the neighbor base station information does not include the information indicating a base station of the second one of the plurality of communication systems.

2. A mobile terminal apparatus as set forth in claim 1, wherein the plurality of communication systems have respectively a priority order, and the control part sets the first mode when the priority order of the second one of the plurality of communication systems contained in the neighbor base station information is higher than the priority order of the first one of the plurality of communication systems.

3. A mobile terminal apparatus as set forth in claim 1, wherein the reselection processing part periodically executes the reselection processing by a predetermined time cycle, and the control part performs updating as to which of the first mode or the second mode is to be set whenever the neighbor base station acquisition part receives the neighbor base station information, judges the set mode when the predetermined cycle comes, and determines whether or not the reselection processing is to be inhibited.

4. A mobile terminal apparatus as set forth in claim 2, wherein the reselection processing part periodically executes the reselection processing by a predetermined time period, and the control part performs updating as to which of the first mode or the second mode is to be set whenever the neighbor base station acquisition part receives the neighbor base station information, judges the set mode when the predetermined cycle comes, and determines whether or not the reselection processing is to be inhibited.

5. A mobile terminal apparatus as set forth in claim 1, wherein the reselection processing part periodically executes the reselection processing by a predetermined time period, and the control part judges the set mode when an update occasion for updating the predetermined period comes, starts the count of the predetermined period when the second mode is set, and does not count the predetermined period when the first mode is set.

6. A mobile terminal apparatus as set forth in claim 2, wherein the reselection processing part periodically executes the reselection processing by a predetermined time period, and the control part judges the set mode when an update occasion for updating the predetermined period comes, starts the count of the predetermined period when the second mode is set, and does not count the predetermined period when the first mode is set.

7. A mobile terminal apparatus as set forth in claim 5, wherein
the update occasion is at least one of a time when the communication part succeeds in a system hand-off or a time when communication over a traffic channel ends.

8. A mobile terminal apparatus as set forth in claim 6, wherein
the update occasion is at least one of a time when the communication part succeeds in a system hand-off or a time when communication over a traffic channel ends.

9. A mobile terminal apparatus as set forth in claim 1, wherein
the control part sets the second mode when conditions become ones where the communication part cannot acquire any of the plurality of communication systems.

10. A mobile terminal apparatus as set forth in claim 1, wherein
the control part executes the system hand-off processing and sets the first mode when failing in the system hand-off.

11. A mobile terminal apparatus as set forth in claim 1, wherein
the control part executes the system hand-off processing and sets the second mode when succeeding in the system hand-off.

12. A communication method of a mobile terminal apparatus capable of standing by while switching among a plurality of communication systems and performing wireless communication with a base station of a first one of the plurality of communication systems capable of providing neighbor base station information, wherein each one of the plurality of communication systems operates in a frequency band different from at least one other of the plurality of communication systems, the method comprising:
a neighbor base station information acquisition step of acquiring neighbor base station information from the base station of the first one of the plurality of communication systems,
a signal strength monitoring step of monitoring a signal strength in the first one of the plurality of communication systems being used,
a system hand-off step of performing hand-off to a second one of the plurality of communication systems stored in the neighbor base station information when the present signal strength becomes lower than a predetermined amount, wherein the second one of the plurality of communication systems is different from the first one of the plurality of communication systems,
a reselection step of releasing a session of the first one of the plurality of communication systems used at present, attempting acquisition for the plurality of communication systems, and attempting position registration by a successfully acquired second one of the plurality of communication systems, wherein the reselection step is not a handover step, and
a reselection inhibit step of selecting a first mode of inhibiting the processing of the reselection step, when the neighbor base station information received in the neighbor base station information acquisition step includes information indicating a base station of the second one of the plurality of communication systems, or selecting a second mode not inhibiting the processing of the reselection step when the neighbor base station information does not include the information indicating a base station of the second one of the plurality of communication systems.

13. A wireless network system comprising:
a plurality of base stations; and
a mobile terminal apparatus capable of standing by while switching among a plurality of communication systems, wherein each one of the plurality of base stations is associated with at least one of the plurality of communication systems, wherein each one of the plurality of communication systems operates in a frequency band different from at least one other of the plurality of communication systems, wherein
a present base station can provide neighbor base station information to the mobile terminal apparatus when communicating with the mobile terminal apparatus,
the mobile terminal apparatus comprises
a communication part capable of communication with the present base station by selecting a first one of the plurality of communication systems, and
a control part capable of changing the communication system used by the communication part and making the communication part perform the wireless communication, and
the control part executes
a neighbor base station information acquisition process to acquire the neighbor base station information from the present base station communicated with at present by the communication part,
a signal strength monitor process to monitor a signal strength in a first one of the plurality of communication systems, wherein the first one of the plurality of communication systems comprises the present base station,
a system hand-off process to perform hand-off to a second one of the plurality of communication systems stored in the neighbor base station information when the present signal strength becomes lower than a predetermined amount, wherein the second one of the plurality of communication systems is different from the first one of the plurality of communication systems,
a reselection process to release a session of the first one of the plurality of communication systems, attempt acquisition for the plurality of communication systems, and attempt position registration by a successfully acquired second one of the plurality of communication systems, wherein the reselection process is not a handover process, and
a reselection inhibit process to select a first mode of inhibiting the reselection process, when the neighbor base station information received by the neighbor base station information acquisition process includes information indicating the second one of the plurality of communication systems, or select a second mode not inhibiting the reselection process when the neighbor base station information does not include the information indicating the second one of the plurality of communication systems.

14. A mobile terminal apparatus capable of standing by while switching among a plurality of communication systems, wherein each one of the plurality of communication systems operates in a frequency band different from at least one other of the plurality of communication systems, comprising:
a communication part capable of selecting a first one of the plurality of communication systems and wirelessly communicating with a base station of the first one of the plurality of communication systems;

a control part capable of changing the first one of the plurality of communication systems used by the communication part and making the communication part perform wireless communication, wherein the control part comprises:

a neighbor base station information acquisition part using the communication part to obtain neighbor base station information from the base station of the first one of the plurality of communication systems, wherein the second one of the plurality of communication systems is different from the first one of the plurality of communication systems, a reselection processing part performing reselection processing to release a session of the first one of the plurality of communication systems, attempt acquisition for the plurality of communication systems, and attempt position registration in a successfully acquired second one of the plurality of the communication systems, wherein the reselection processing is not a handover processing, and a reselection inhibition part selecting a first mode of inhibiting the reselection processing, when neighbor base station information received at the neighbor base station information acquisition part includes information indicating a base station of the second one of the plurality of communication systems, or selecting a second mode not inhibiting the reselection processing when the neighbor base station information does not include the information indicating a base station of the second one of the plurality of communication systems.

15. A communication method of a mobile terminal apparatus capable of standing by while switching among a plurality of communication systems and performing wireless communication with a base station of a first one of the plurality of communication systems capable of providing neighbor base station information, wherein each one of the plurality of communication systems operates in a frequency band different from at least one other of the plurality of communication systems, the method comprising:

a neighbor base station information acquisition step of acquiring neighbor base station information from the base station of the first one of the plurality of communication systems, wherein the second one of the plurality of communication systems is different from the first one of the plurality of communication systems;

a reselection step of releasing a session of the first one of the plurality of communication systems used at present, attempting acquisition for the plurality of communication systems, and attempting position registration by a successfully acquired second one of the plurality of communication systems, wherein the reselection step is not a handover step; and a reselection inhibit step of selecting a first mode of inhibiting the processing of the reselection step, when the neighbor base station information received in the neighbor base station information acquisition step includes information indicating a base station of the second one of the plurality of communication systems, or selecting a second mode not inhibiting the processing of the reselection step when the neighbor base station information does not include the information indicating a base station of the second one of the plurality of communication systems.

* * * * *